UNITED STATES PATENT OFFICE.

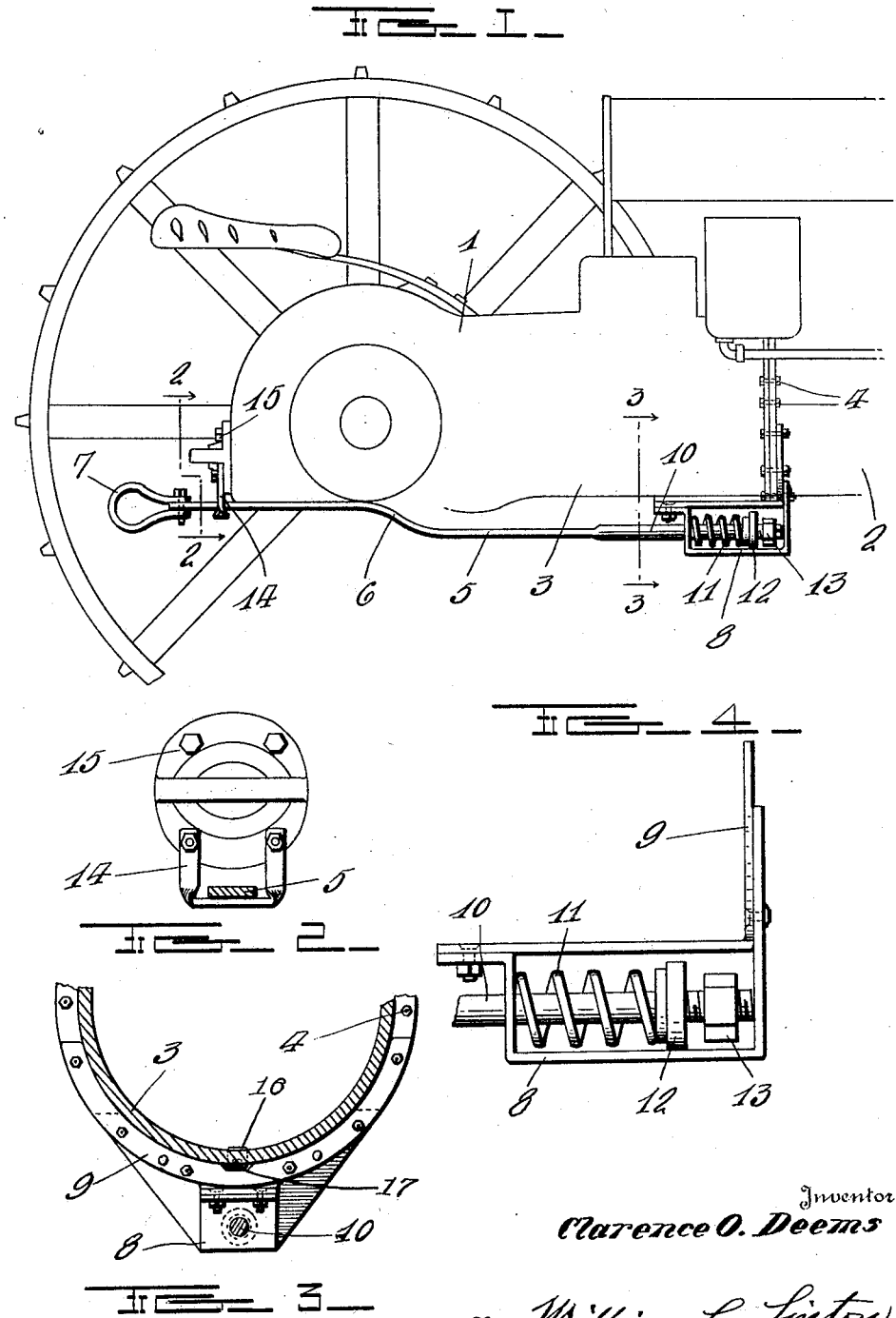

CLARENCE O. DEEMS, OF MISSION, TEXAS.

DRAFT CONNECTION.

1,408,081. Specification of Letters Patent. Patented Feb. 28, 1922.

Application filed October 24, 1921. Serial No. 510,034.

*To all whom it may concern:*

Be it known that I, CLARENCE O. DEEMS, a citizen of the United States of America, residing at Mission, in the county of Hidalgo and State of Texas, have invented certain new and useful Improvements in Draft Connections; and I do hereby declare that the following is a full, clear, concise, and exact description of the same, such as will enable others skilled in the art to which it appertains to make and use the same.

This invention relates to improvements in a novel form of draft connection or draw bar particularly adaptable for use upon tractors of the Ford design, having for an object to provide a draw bar which in use upon a tractor of the design mentioned will function to equalize the pull or stress of a load upon such tractor and to lower the center of gravity with respect to its line of drive from the engine to the driving wheel in order that the forward end, including the steering wheel, and likewise, the driving wheels, will be maintained in positive engagement with the surface over which they are traveling, thus increasing the tractive efficiency of the machine and also, preventing the overturning of the same or the raising of the steering wheels from the surface so frequently occurring with the now prevalent forms of draft connections employed upon these tractors, wherein the application or direction of the bulk of a load occurs at the rear end of the tractor.

It is also an object of the invention to provide a draft connection having resilient connection with the tractor, in order that the application of stress exerted by a load will be evenly applied to the same, rather than by the jolting which would be occasioned with the abrupt "taking-up" of a load.

Other objects will be in part obvious and in part pointed out hereinafter.

In order that the invention and its mode of operation may be readily understood by persons skilled in the art, I have in the accompanying illustrative drawings and in the detailed following description based thereon, set out one possible embodiment of the same.

In these drawings:—

Figure 1 is a fragmentary section of a tractor of the Ford design having my improved draw bar arranged thereupon;

Figure 2 is a vertical transverse section taken on the line 2—2 of Figure 1, looking in the direction in which the arrows point;

Figure 3 is a similar section taken on the line 3—3 of Figure 1, looking in the direction in which the arrows point; and, Figure 4 is an enlarged fragmentary detail in section showing the mode of connection as between the draw bar and the tractor.

Having more particular reference to the drawings, in connection with which like reference characters will designate corresponding parts throughout, I have shown, for purposes of illustration, my improved draft connection or draw bar arranged upon a tractor of the Ford design, fragmentally shown and indicated in its entirety by the numeral 1. While reference is being had to the tractor 1, it should be noted that the crank case 2 thereof abuts the casing 3 of the power transmission mechanism and that these two elements of construction are joined by passing bolts 4 through the adjacent flanges formed thereupon.

The improved draft connection consists of a draw bar 5, off-set intermediate its ends as at 6, for a purpose which will be subsequently apparent, while the fore-part thereof is cylindrically formed and has its free extremity screw threaded whereby to receive means, hereinafter described, for effecting positive connection as between it and the tractor 1. A clevis 7 is pivoted to the rear extremity of the draw bar 5 and as will be noted, is arranged at a point rearwardly of the driving connection between the rear wheels of the tractor and its motive means.

To effect connection between the forward end of the draw bar 5 and the tractor, a substantially rectangular bracket 8 is provided having an arcuate yoke 9 secured to its forward end and arranged in a plane above the same; the curvature of said yoke corresponding to that of the abutting flanges of the crank case and transmission case 2 and 3 respectively, whereby it may be arranged adjacent the same and connected thereto by passing certain of the bolts 4 therethrough as well as through the abutting flanges. The straight upper side or top of the bracket 8 is disposed longitudinally of the forward portion of the under side of the transmission case or housing 3 and has flush engagement with the same throughout its length, whereby to coact with means for supporting the rear portion of the draw bar 5 to prevent material vibratory motion thereof. The forward or cylindrical portion 10 of the draw bar is extended through an opening formed in the rear end of the bracket 8 and has a coiled spring 11 arranged thereabout and engaged by a collar 12 passed over its forward end, whereupon a locking nut 13 is engaged with the screw threaded portion of the same. Thus, it will be understood that since the coiled spring 11 has bearing at its rear end upon the corresponding end of the bracket 8, while its forward end has bearing upon the collar 12 which in turn is locked upon the draw bar 5 through the medium of the lock nut 13, said draw bar will be afforded a resilient connection with the tractor at a point below the line of drive from the motive means thereof through the transmission casing 3 to its driving wheel.

The rear portion of the draw bar 5 is received upon the base of a substantially U-shaped bracket 14 which in turn is connected as at 15 to the corresponding end of the transmission case 3, it being understood in this connection, that the arrangement is such as will permit of the positioning of the clevis 7 at a point beyond said bracket 14. Because of the fact that downward movement of the rear portion of the draw bar 5 with respect to the transmission case 3 will be prevented, due to its engagement with the U-shaped bracket 14, taken together with the fact that the straight upper side of the rectangular bracket 8 has flush engagement with that portion of the transmission case 3 adjacent the same, it will be understood, as hereinbefore stated, that material or detrimental vibratory motion of said draw bar will be prevented.

In order that the arcuate yoke 9 will afford sufficient clearance for the oil drain valve 16 of the crank case 2, I may and preferably do notch or recess the same as at 17 in order that it may be freely engaged thereover.

Due to the specific mode of connection of the draw bar 5 with the crank case 2 and transmission case 3 of the tractor, the line of draft will be lowered with relation to the center of gravity of said tractor, and hence, said lowered line of draft will direct a downward pull upon the tractor in a manner to insure the constant engagement of the steering wheels as well as the driving wheels of the same with that surface over which the tractor is moving. Also, since the connection of the draw bar 5 is substantially centralized with relation to the tractor, it is to be understood that the application of stress to the same will be evenly or uniformly diffused throughout its construction. The yieldable connection between the crank and transmission cases 2 and 3, and the draw bar 5, by arrangement of the coiled spring 11 upon the forward cylindrical end thereof, will serve to cushion the application of initial stress to the tractor as the same "takes up" a load to be drawn thereby, thus dispensing with those deteriorating effects occasioned by the abrupt application of a load to a tractor.

Manifestly, the construction shown is capable of considerable modification and such modification as is within the spirit of my invention, I consider within the spirit of my claims.

I claim:

1. In combination with a tractor and the transmission casing thereof, a draw bar disposed longitudinally of the under side thereof having its forward portion formed cylindrically, a bracket arranged adjacent the under side of the power transmission case and connected to the crank case adjacent its point of juncture with the power transmission case, said cylindrical portion being slidably received by the bracket, resilient means for effecting connection between the cylindrical portion and the bracket, and means for slidably supporting the rear portion of said draw bar with relation to the corresponding part of the power transmission case.

2. In combination with a tractor and the transmission casing of the same, a draw bar disposed longitudinally of the under side thereof off-set intermediate its length and having the forward portion thereof formed cylindrically, a substantially rectangular bracket arranged adjacent the under side of the power transmission case and connected to the crank case adjacent its point of juncture with said power transmission case, said cylindrical portion of the draw bar being slidably received in the rectangular bracket, resilient connection between the forward end of the draw bar and the bracket, means for supporting the rear portion of the draw bar with relation to the corresponding end of the power transmission casing, and a clevis secured to the rear end of said draw bar.

In witness whereof I have hereunto set my hand.

CLARENCE O. DEEMS.